United States Patent [19]

Ojserkis

[11] Patent Number: 4,514,924
[45] Date of Patent: May 7, 1985

[54] OPENING DEVICE FOR A TRAWL NET

[76] Inventor: Maurice J. Ojserkis, A-14 Point Gardens Apartments, Somers Point, N.J. 08244

[21] Appl. No.: 396,783

[22] Filed: Jul. 9, 1982

[51] Int. Cl.³ .............................................. A01N 93/02
[52] U.S. Cl. ............................................................ 43/9
[58] Field of Search ........................................ 43/9, 106

[56] References Cited

U.S. PATENT DOCUMENTS 2,608,782  9/1952  Bottemanne ................................ 43/9
4,193,219  3/1980  Pogue ...................................... 43/106

Primary Examiner—Nicholas P. Godici
Assistant Examiner—M. Jordan

[57] ABSTRACT

An apparatus and method for fishing by trawling operation with a substantial reduction in the amount of energy needed to be used by the fishing vessel for the operation, including providing a conventional type trawl fishing net with a flexible but normally flaccid hose structure around the mouth opening, providing said structure with means for pressurization of said normally flaccid hose in order to make same rigid, and thus open the fishing net mouth to its normal open configuration, and providing a high pressure retention and release valve between the pressurization pump and the flexible hose structure for maintaining the hose in the pressurized state during the fishing operation, and permitting the release of the pressurization in order to close the net mouth opening prior to bringing the fishing net back aboard the fishing vessel.

1 Claim, 5 Drawing Figures

OPENING DEVICE FOR A TRAWL NET

This invention is the subject matter of my Disclosure Document No. 093793, filed Sept. 9, 1980, entitled "Trawl Net Opening Device".

This invention relates generally to trawl nets and, more particularly, to a device for opening the mouth of the trawl net.

BACKGROUND OF THE INVENTION

One major problem with known trawl net opening devices is the fact that substantial power is expended in using same. For example, with commonly known trawl-doors which are operated at an angle to the forward motion of the trawl boat, it has been reported by T. Kowalski and J. Giannoti of the University of Rhode Island, Marine Technical Report No. 16, that approximately 44% of the total drag is used by a fishing trawl boat in overcoming the resistance of the trawl doors in operation.

According to the Food & Agriculture Organization of the United Nations, 70% of the commercial fishing of the world employs such well known and conventional trawl-doors in bottom and midwater otter trawl type fishing nets. Other common problems of known type trawl net opening devices is their cumbersome operation, as well as the great number of elements involved which, of course, require constant maintenance and repair and such devices are also relatively expensive and costly.

Another common problem with known type of trawl net opening devices is that because of their cumbersome operation, considerable skill is required in their use and operation.

The following four patents may be pertinent to this invention and are identified as follows:

| Y. Matsumura | 1,305,483 | June 3, 1919 |
| F. J. Luketa | 3,281,980 | Nov. 1, 1966 |
| Fuhrboter et al | 4,052,800 | Oct. 11, 1977 |
| Bourret | 4,224,755 | Sept. 30, 1980 |

My invention is based upon the principles of PASCAL and of ARCHIMEDES. Blase Pascal (1623–1662) promulgated the law "Pressure applied to an enclosed fluid is transmitted undiminshed to every portion of the fluid and the walls of the containing vessel." (This is a necessary consequence of the laws of fluid mechanics, rather than an independent principle.)

In a fluid, such as water which is incompressible, a change in pressure of one portion of the fluid is transmitted instantenously to all other parts. Also, changes in temperature accompany changes in pressure in a compressible fluid.

As in an automotive hydraulic jack, since the walls of the hydraulic jack are confining and do not expand, when pressure is introduced to the fluid, the working surface of the jack must lift and raise-up the load or car. Equally in a flexible hose, when pressure of a fluid is introduced within the strength limits of the hose, the hose must tend to become straight and rigid.

ARCHIMEDES principle is also a necessary consequence of the laws of fluid statics. When a body is wholly or partly immersed in a fluid, such as sea-water at rest, the fluid exerts pressure on every part of the body's surface in contact with the fluid. The pressure is greater on the parts immersed more deeply. The resultant of all the forces is an upward buoyancy force of the immersed body.

ARCHIMEDES principle, namely, "that a body wholly or partly immersed in a fluid is buoyed up with a force equal to the force equal to the weight of the fluid displaced by the body". This force acts vertically up through the center of gravity of the fluid before its displacement. The corresponding point in the immersed body is called its center of buoyancy.

In the case of my improved trawl net, normally used floats, rollers, wheels and chains are used as required. Also, a pressure compensating release can be incorporated on the fill/release valve to aid in depth compensation. When trawling depths are known, pressure can be adjusted in the hose ahead of time, thus saving considerable time over adjustments needed when trawling with conventional trawl doors.

SUMMARY OF THE INVENTION

An object of the present invention is to provide a novel opening device for a conventional type trawl net which reduces the power required to haul such a trawl net through the water when it is pulled by a trawl boat and to eliminate the large high resistance trawl doors now used to open trawl nets.

Another object of the present invention is to provide a trawl net opening device which is simple in operation, inexpensive to use, and one which permits easy handling and manipulation of the trawl net during initial setup as well as during the actual trawland the hauling back in operations of a fully loaded net of fish.

A further object of the invention is to provide a trawl net opening device which permits quick and easy release and collapse of the device when the trawling and fishing operation is completed and it is desired to close the trawl net mouth opening.

Another further object of the invention is to provide a trawl net opening device which may be used as an attachment to and in conjunction with a conventional type trawl net without the need for trawl doors and one which may be quickly and easily installed and assembled in the field or at sea.

One of the big advantages of the present invention is that relatively simple components or elements are used in the initial assembly and installation. Once assembled, the trawl net opening device can be easily attached to the mouth opening of the trawl net. The trawl net is then handled in almost the same manner as is done in conventional commercial trawl fishing and with much less labor. A trawling or towing rig of conventional construction is normally used with the device. An additional piece of equipment necessary for the use of my trawl net opening device is a high pressure fluid pump mounted aboard the boat. This pump is used during the initial opening of the trawl net device and is suitably connected thereto for supplying high pressure liquid, such as seawater, to the opening device. A special retention quick-release fill/dump valve is connected in the pressurizing line for the purpose of maintaining pressure and permitting release of the pressure contained within the opening device when it is desired to close the mouth of the trawl net after completion of the fishing operation.

As indicated above, conventional types of trawl-doors require considerable engine power to effectively operate same and to overcome the resistance caused by the trawl doors which accounts for about 44% of the total drag experienced by a trawl boat pulling a conventional trawl net. With the opening device of the present invention comprising a series of pressurized hoses arranged in such a manner as to force open the mouth of the net, this power requirement is substantially reduced as the large trawl doors have been eliminated. In essence, a plurality of hoses, such as four or more flexible hoses are arranged in a generally rectangular form with suitable side connectors or risers between the headrope and the foot-rope, and said hoses are attached to the trawl net mouth opening. The hoses are normally flaccid when empty or without an internal pressure being applied thereto. However, the hoses become rigid when pressure is applied internally thereof. In accordance with the invention, the plurality of connected hoses, which have a rectangular form will under pressure force open the mouth of the net and will assume a catenary shape when being pulled through the water. The catenary shape achieved will be very similar to that obtained when conventional trawl doors are used to open up the mouth of a conventional trawl net.

The hoses may be suitably connected together by means of connecting elbows of proper size, and will be pressurized by seawater from the high-pressure pump aboard the fishing boat with which it is being used. After the opening device has been pressurized from the pump, the filler hose is suitably detached and the net is allowed to sink towards the bottom in a normal fashion for mid-water or bottom trawling operation.

The filler hose end is normally attached to a lanyard cable whose extreme is connected to the trawl cable itself to facilitate later recovery after the trawling operation so that the hose assembly can be depressurized prior to the hauling-in of the net so that the fish and/or shrimp in the cod-end of the net can be dumped aboard the fishing vessel. The depressurizing is done just before dumping the net on the deck so that the fish and/or shrimp in the net are prevented from swimming out of the net. By utilizing the invention, less power is needed from the engine when hauling in the net and less wear and tear is experienced on the engine and winch. The filler hose can have a quick-disconnect fitting on the end nearest to the pump for easy disconnect after pressurizing the net hose assembly. Normally, a push-pull control cable is used to open and close the fill/dump valve but other suitable methods, such as an electronic remote control may also be used. When pressure has been released, the net is pulled in in the usual manner.

These and other objects and advantages of the invention which will become subsequently apparent reside in the details of construction and operation of the opening device as will be more fully described and claimed herein, reference being made to the accompanying drawings forming a part hereof, wherein like numerals refer to like parts throughout.

BRIEF DESCRIPTION OF THE DRAWINGS

FIG. 1A is a diagramatic plan view of a conventional type trawl net with a pair of trawl doors;

DESCRIPTION OF THE PREFERRED EMBODIMENTS

Figure 1:
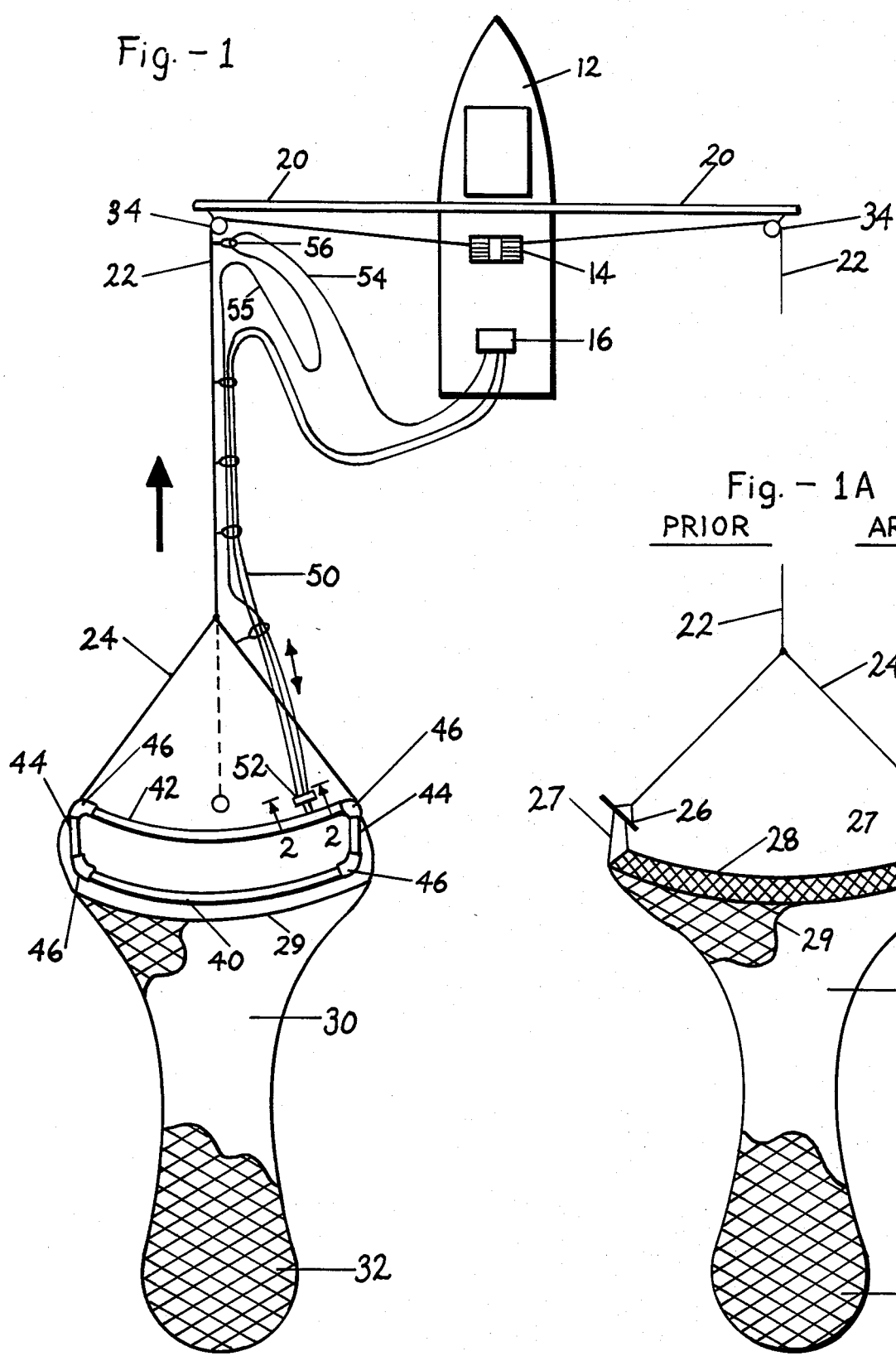
FIG. 1 is a diagrammatic plan view of a trawling vessel showing a net opening device of the invention in a fully open condition with a conventional type trawl net.

Referring now to FIGS. 1-1A of the drawings, reference numeral 12 indicates in general a fishing boat which may be used for fishing with conventional type trawl nets as well as such nets when improved with the present invention. A fishing boat 12, which generally is used for catching shrimp and other marine life is normally provided with a winch 14 for use in hauling the trawl nets aboard with a conventional outrigger structure 20 shown in simplified form in FIG. 1.

As is conventional, the trawl or towline cable 22 is normally connected to a bridle 24 for towing a trawl net. In FIG. 1A, a conventional type net structure is shown. As shown therein, conventional type trawl-doors 26 are attached by suitable connectors 27 to the respective ends of a foot rope 28 and a head rope 29. The conventional trawl net is indicated by 30 and is provided with a cod-end 32. During use, as the trawl net is towed through the water by the fishing vessel, the trawl-doors 26 force open the mouth of the net to the approximate catenary shape shown therein. Standard weights, floats, chains, and rollers are used as required. Such arrangement or system applied to both bottom type and also mid-water type trawling. Trawl or towline cable 22 normally passes through a suitable sheave 34 on the outrigger 20.

In FIG. 1, there is shown the improved opening device of the present invention. A conventional trawl-net 30 with a cod-end 32 is also shown. However, the opening device of the present invention is attached in parallel and in front of the conventional net which normally does not require any real modification or changes. The device is somewhat rectangular in form to match the size of the net opening, and the component hoses of the device are attached to the mouth or net opening by a series of conventional chokeslings, snaps, attaching ropes or clamps as is required to securely fasten the device to the net. The hoses normally are two to three inches in diameter (approximately 50-mm to 76-mm), but may be varied in diameter, length and total quantity according to the size of the net to which the device is to be attached. The upper flexible hose or hoses 40 are attached to the net head-rope 29, while the lower flexible hose or hoses 42 are attached to the foot-rope 28 of the conventional net, while left and right riser hoses 44 attach to corresponding locations on the said conventional net.

The hoses are made inter-connecting by the use of suitable high pressure rated elbows 46 which mate with the high pressure hose couplings on the respective ends of each hose assembly. On one of the hoses near its end, there is a suitable remote controlled fill-dump valve 52 which permits pressurizing the hose assembly for opening the mouth of the net, and for retaining of said pressurization, and for releasing pressurization when desired at the termination of a desired trawling period. With the depressurization of the hose assembly, the hoses collapse and, of course, permit the mouth of the net to close, thereby prohibiting the escape of marine species from the net.

It should also be noted that this collapsing feature is an important advantage to the fisherman in that with the invention, there is no need to pull in the net with trawl doors wide open and net maintained open while using normal trawling speed as is normally the case with the conventional net opening of FIG. 1A for fear that marine species will escape. Of course, there is also no need for full trawling speed nor the inherent oppressive strain on the winch with the opening device of the present invention as the net is pulled in when the vessel is not trawling.

The fill/dump valve 52 in turn is connected to a flexible filler hose 50 which at the time of opening of the net mouth, is initially connected to a high-pressure pump 16 on board the fishing vessel 12. Once the hose assembly is pressurized, then the fill/dump valve 52 is closed to lock pressure inside the hose assembly by way of a remote control push/pull cable 55. After pressurizing the hose assembly, the filler hose 50 and the connected lanyard cable 54, are released from the hydraulic pump on the boat deck, and they are allowed to slide loose into the water.

The further end of lanyard rope 54 which is away from the end connected to the filler hose loose end, and the push-pull cable end runs through a suitable loop which may be fixed by a wire clamp at the desired location 56 on the trawl cable 22. During normal trawling operations the loose end of push-pull cable 55 and filler hose 50 trail free astern of the fishing trawler 12. When a trawling operation is concluded after a specific period, say in the case of a left trawl net (when viewed from above and in back of the boat 12), the boat stern is turned to the right momentarily so that with the use of an implement such as a boat-hook (not shown) the lanyard rope 54 can be grabbed or retrieved and with the lanyard rope 54 the ends of the filler hose 50 and push-pull cable 55 can be pulled into the boat 12 for attachment to the pump 16 and to the actuator control for the fill/dump valve 52. It should be understood, the end of the lanyard rope 54 is normally trailing loose in the water. The filler hose 50 and push-pull cable 55 run along the trawl cable 22 and are attached thereto either by suitable means, such as special ferrules and clamps, or by spiral wrapped plastic retainers.

The fill/dump valve 52 forma a part of the opening device of the invention and is used in combination with the hose assembly so that the overall unit functions as a complete system or entity, and one in which the hoses can be inflated and deflated by remote control. The fill/dump valve 52 may also be operated electronically or electrically rather than by mechanical means. The lanyard line 54 can also be connected directly to the fill/dump valve 52 for its actuation.

The hose used in the present invention may be a suitable high pressure braided hose with ratings of up to 800-pounds per square inch, so that maximum lineal stiffness may be utilized. Once the trawl net has been lowered to its trawling depth (in fathoms) in the water, the water pressure outside the hose will tend to counteract the pressure therewithin, and reduce the amount of lineal stiffness, however, the initial pressure placed inside the hoses will more than compensate for any external pressure exerted thereon. A pressure relief valve may be incorporated near the fill/dump valve 52 on the hose assembly so that any excessive pressure can be avoided. Such an arrangement will insure longer life for the hose assemblies, but is not absolutely necessary.

Reference numeral 57 (shown in dotted lines) represents an optional center bridle cable pair or multiples thereof can be used to insure obtaining the desired catenary shape of the net head and foot ropes. The lengths of the auxiliary bridle cable pairs will easily set the desired catenary. For the larger mouth opening otter type trawl nets, multiple hose assemblies may be attached to head and foot ropes to compensate for stiffness needed to effect the desired catenary curves and mouth openings. Such multiple hose assemblies would be inter-connected and parallel to each other and in this way be operated by the normal standard fill/dump valve 52 regardless of the number of parallel assemblies.

Figure 2:
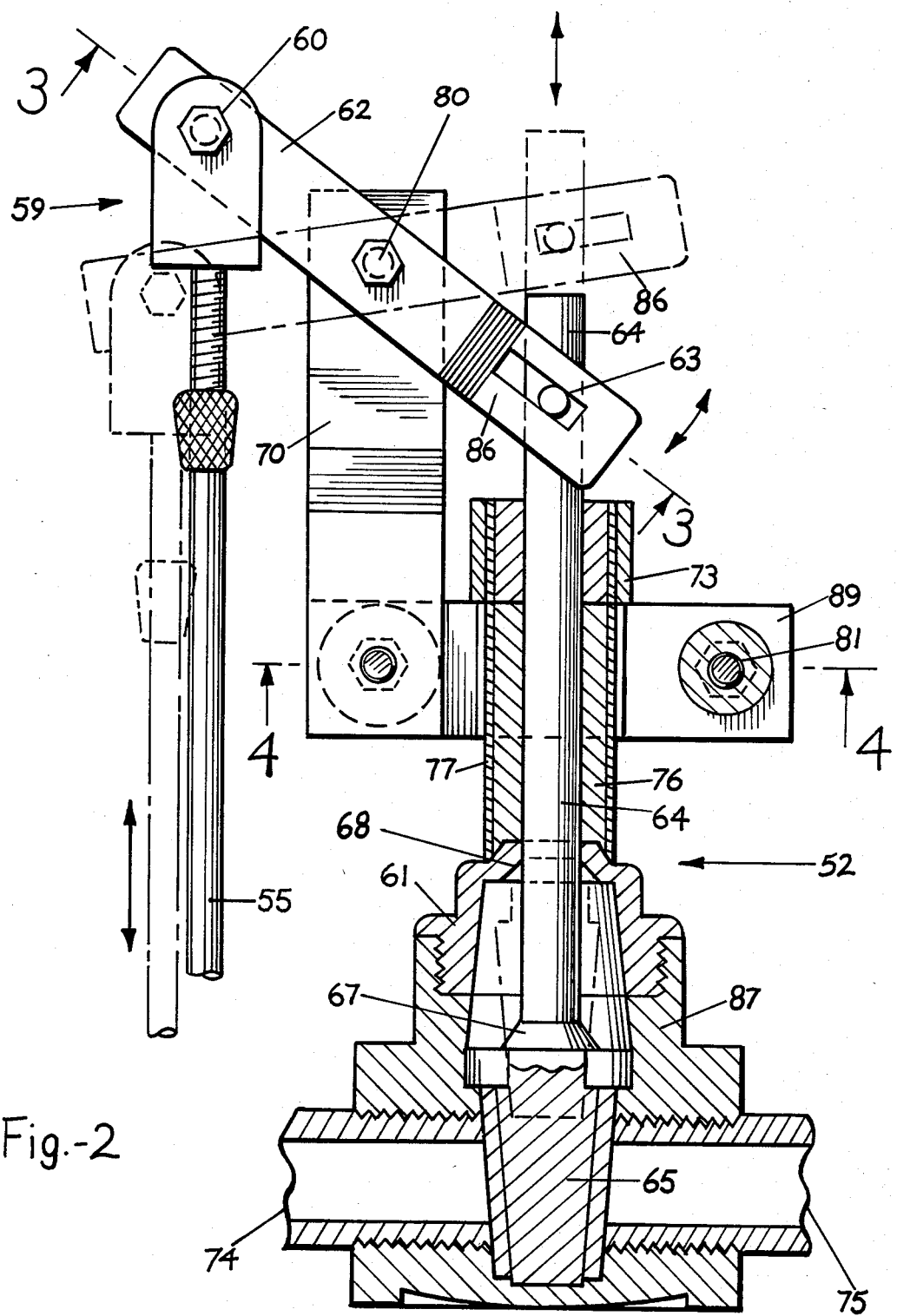
FIG. 2 is a cross-sectional view of the fill/dump valve taken along the line 2—2 of FIG. 1.
Figure 3:
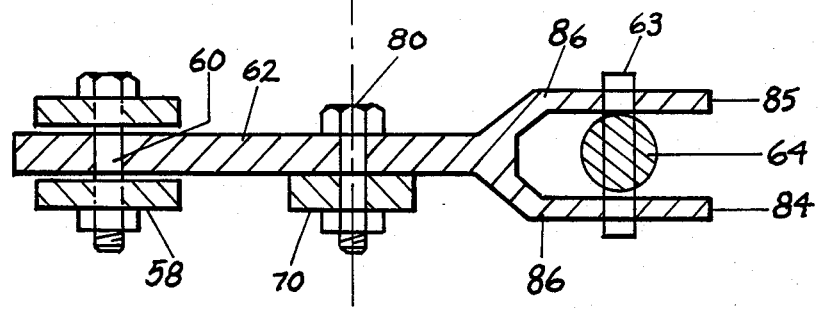
FIG. 3 is a cross-sectional view taken along the line 3—3 of FIG. 2.
Figure 4:
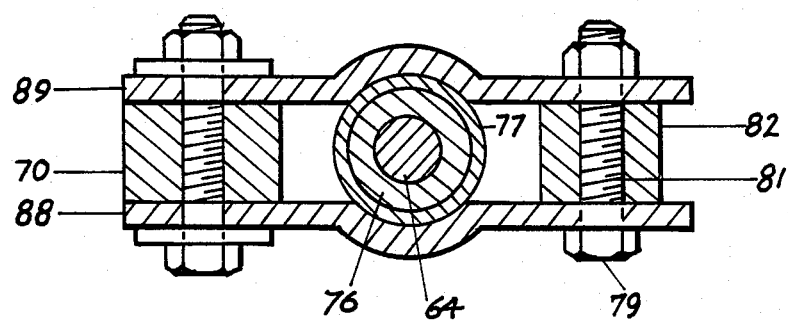
FIG. 4 is a cross-sectional view taken along the line 4—4 of FIG. 2.

With reference to FIGS. 2-4, when the hose assemblies are inflated using fill/dump valve 52, one way of actuating same is by use of the push-pull cable 55 of which one extreme is connected to a manual control aboard the fishing vessel at time of desired actuating, while the other extreme end is attached by way of a suitable clevis 59 to pivot arm 62 with bolt hole 58 mating with bolt hole 60. Pivot-arm 62 pivots at point 80 on a suitable bracket assembly attached to the valve 52. The other end of pivot arm 62 is attached via a slotted opening 86 which allows pin 63 to lift up and outwards the valve wedge stem 64 and wedge itself 65 and to close same when desired. The fill/dump valve 52 comprises body 87 with inlet and outlet ports 74, 75 and top fitting 61 which threads into the body. A tapered stop 67 mates with opening 68 when the valve is fully opened and effectively prevents pressure from escaping up and around the valve stem 64. Above the opening 68 there is a plastic circular bearing 76 made of material, such as nylon, for ease of operation and maintaining of the alignment of the stem 64. Such a plastic bearing is confined in shell 77 which is an integral part of top fitting 61. A gland 73 (or seal) offers increased pressure reliability at the top of the fill/dump valve 52. The solid lines of pivot arm 62 show the valve stem in an open position, while the phantom lines thereof show pivot arm 62 in the valve closed position. FIG. 4 shows in cross-sectional detail how pivot arm supporting bracket is attached to the valve 52. Straps of a suitable material such as bronze, indicated by reference numerals 88 and 89, surround the valve stem assembly, and the bolt-nut assemblies 72 and 79 are clamp supported to the valve stem. A suitably sized bushing 82 is mounted over the bolt 81 secured by bold-nut assembly 79. Upright 70 at point 80 allows pivot-arm 62 to pivot at this point. When the manual control on the boat deck is actuated to open the fill/dump valve, the push-pull cable 55 clevis position is retracted as indicated on the drawing in the phantom position for opening up the gate in the valve 52. When closing the fill/dump valve 52, the push-pull cable 55 is extended up to point 60 which represent a movement of about two inches travel, a factor well within the design limits of the push-pull cable assembly. The unit is so designed that clevis 59 when retracting is in its strongest mode, thereby being better able to overcome the high pressure on both sides of the wedge 65 when fill hose and net hose assemblies are under pressure. It should be noted there is no pressure to overcome when in the fill mode and wedge 65 is entering into the body of the valve.

The pivot-arm 62 is a Y-shaped yoke with a clevis and consisting of tangs 84 and 85. The slot in each tang permits the valve stem 64 to rise vertically while allowing pin 63 to travel as required in the slots.

While the device of the present invention is relatively simple, it substantially reduces drag as well as the power requirements needed by a fishing vessel and thus substantially reduces the cost for fuel during a trawling operation. As a conventional fishing vessel using a known trawl net uses thousands of dollars and gallons of fuel per year, eliminating a substantial portion of the total drag will in the course of a year, result in a very substantial cost saving of energy and fuel and can thus easily represent the difference to a fisherman between making a profit or operating at a loss.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to falling within the scope of the invention.

I claim:

1. An improved method of fishing using a conventional type fishing net to be trawled but without the use of trawling doors and requiring substantially less use of energy than is normally required with a conventional net having trawling doors and a mouth opening comprising the steps of attaching a normally flaccid flexible hose structure around said mouth opening of the net;

suspending the net from a fishing vessel so as to be capable of applying hydraulic fluid under high pressure to the normally flaccid flexible hose structure in order to make same rigid for holding the mouth of the fishing net open;

performing trawling operations in a conventional manner; and releasing the hydraulic pressure from the flexible structure in order to collapse same together with the mouth opening in order to close said fishing net prior to hauling the net aboard the vessel.

* * * * *